(12) United States Patent
McCloskey et al.

(10) Patent No.: US 10,138,071 B1
(45) Date of Patent: Nov. 27, 2018

(54) COUNTERWEIGHT STACKER

(71) Applicant: McCloskey International Limited, Keen (CA)

(72) Inventors: Paschal James McCloskey, Keen (CA); Al Nottingham, Keen (CA)

(73) Assignee: McCloskey International Limited, Keen, Ontario (CA)

( * ) Notice: Subject to any disclaimer, the term of this patent is extended or adjusted under 35 U.S.C. 154(b) by 0 days.

(21) Appl. No.: 15/841,441

(22) Filed: Dec. 14, 2017

(51) Int. Cl.
*B65G 41/00* (2006.01)

(52) U.S. Cl.
CPC ......... *B65G 41/002* (2013.01); *B65G 41/008* (2013.01)

(58) Field of Classification Search
CPC .... B65G 41/00; B65G 41/008; B65G 41/002; B65G 47/20
USPC ......................................... 198/300, 311, 313
See application file for complete search history.

(56) References Cited

U.S. PATENT DOCUMENTS

| | | | | |
|---|---|---|---|---|
| 1,821,881 A * | 9/1931 | Coppock | ................ | B65G 65/28 198/311 |
| 1,839,920 A * | 1/1932 | Henry | ................ | B65G 47/1414 221/177 |
| 1,905,056 A * | 4/1933 | Purinton | ............ | B65G 47/1471 198/397.01 |
| 1,908,238 A * | 5/1933 | Hardinge | ................ | B02C 25/00 222/310 |
| 5,129,505 A * | 7/1992 | Winter | ................... | B65G 47/19 198/455 |
| 5,323,939 A * | 6/1994 | Young | .................. | B65D 90/582 222/463 |
| 6,129,196 A * | 10/2000 | Lapper | ................... | B65G 21/14 198/313 |
| 6,360,876 B1 * | 3/2002 | Nohl | ..................... | B65G 41/008 198/302 |
| 2003/0201237 A1 * | 10/2003 | Grichar | ............. | B01D 33/0376 210/785 |
| 2005/0040015 A1 * | 2/2005 | Schlegel | ................ | B65G 65/06 198/519 |
| 2012/0003071 A1 * | 1/2012 | Yoshimoto | ............. | B66C 23/74 414/719 |

* cited by examiner

*Primary Examiner* — James R Bidwell
(74) *Attorney, Agent, or Firm* — Schwabe, Williamson & Wyatt, P.C.

(57) ABSTRACT

A stacking system for conveying bulk material includes a conveyor frame designed to support a conveyor belt, the conveyor frame including forward and rear portions, a hopper designed to receive the bulk material, the hopper being mounted adjacent the rear portion of the conveyor frame, an engine for providing power to the stacking system, a drive pulley for driving the belt, and an idler pulley disposed generally below the hopper. An improvement comprises a counterweight disposed above the idler pulley and to the rear of the hopper. Another way to describe the disclosure is as a counterweight for a belt-type, portable stacking conveyor having forward and rearward portions, a drive pulley disposed toward the forward portion of the conveyor and an idler pulley disposed adjacent the rearward portion of the conveyor, the counterweight being disposed immediately above the idler pulley.

7 Claims, 4 Drawing Sheets

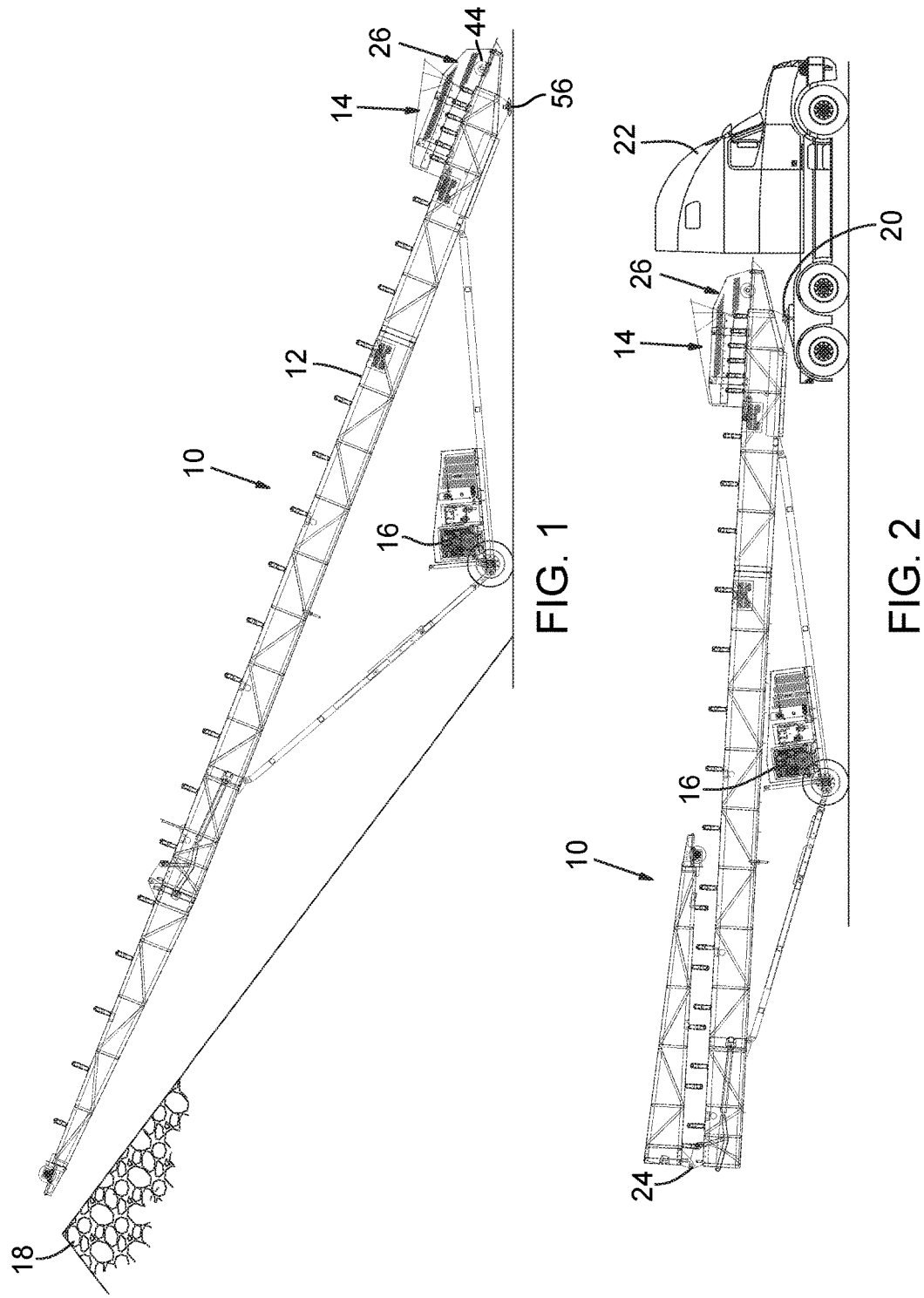

COUNTERWEIGHT STACKER

TECHNICAL FIELD

Embodiments herein relate stackers for stacking bulk material and more particularly to radial stackers used for this purpose.

BACKGROUND

A wide variety of conveying equipment is used to stack bulk material such as gravel, coal, sand, grain, wood waste, dirt and other particulate. Such equipment often is in the form of a belt-type conveyor system, which is able to convey bulk material from a crushing and/or screening plant to create one or more stockpiles or stacks. The stockpiles may take the form of individual conical stacks but more often take the form of an array of stacks formed through the use of so-called radial stackers that can swing radially from side-to-side. Other stackers may be in the form of telescoping stackers, which may also be radial stackers and which are sometimes able to form larger and higher stacks.

Radial stackers have in recent years been designed to be portable. Portable stackers use a carriage having wheels or tracks that are typically mounted to support the power source, usually an internal combustion engine, which provides hydraulic power to the working components of the stacker. When wheeled carriages are used, the conveyor can be pulled down the highway by a tractor instead of having to be loaded onto a flat-bottomed trailer, which is normally the case with tracked carriages. In order to shorten the length and the height of the stacker, the front and/or the rear ends of the stacker are often designed to be folded over one another.

While these stacker designs have proven very popular and successful for many operations, a least one drawback exists with such designs. First, the weight of the engine is centrally disposed, and this limits the height or length of the conveyor because otherwise the front end of the stacker might become unstable and perhaps even topple over. This in turn limits the angle of extension and thus the height of the stack.

This issue has been addressed by attempts to place a box, typically filled with concrete, under the end of the conveyor belt, below the hopper. This does shift the center of gravity rearward and thereby permits the forward end of the stacker to be positioned at a sharper angle, thus increasing the height of the stacks formed thereby. However, because of the position of the box, access to the return idler pulley is restricted. Moreover, some of the material being conveyed by the belt tends to adhere to the belt and as the inverted belt reaches the rear end of the conveyor, some of that material often tends to fall onto the top of the upwardly facing, broad surface of the concrete-filled box. It is difficult to clear out this material since safety mesh often guards this underside area of the conveyor. In time, this material may pile to a height that it reaches the returning belt, and can wear or even tear the belt. This problem is exacerbated if the material freezes into a hard, abrasive mass.

Another approach, which solves the problems with the concrete-filled box below the belt is to use a pair of heavy steel plates, which may be from four to five inches thick. One of these plates is mounted to each side of the conveyor, again, below the hopper. Because the plates are not directed below the belt, and extend vertically, there is little surface on which material can collect. Also, because there are two such weights, they are somewhat easier to handle and often may be simply mounted to heavy duty, exterior hooks, rather than having to position a box below the belt. However, because the weights are made of steel, they can be expensive.

BRIEF DESCRIPTION OF THE DRAWINGS

Embodiments will be readily understood by the following detailed description in conjunction with the accompanying drawings and the appended claims. One embodiment is illustrated by way of example and not by way of limitation in the figures of the accompanying drawings.

FIG. 1 is a side elevation, largely schematic view of a portable, belt-type conveyor having a counterweight, and a stack of bulk material being conveyed by the stacker;

FIG. 2 is a side elevation, largely schematic view of a portable, belt-type conveyor having a counterweight, with the conveyor being mounted to the fifth wheel of a tractor and with the conveyor being folded over for transport;

DETAILED DESCRIPTION OF DISCLOSED EMBODIMENTS

Figure 3:
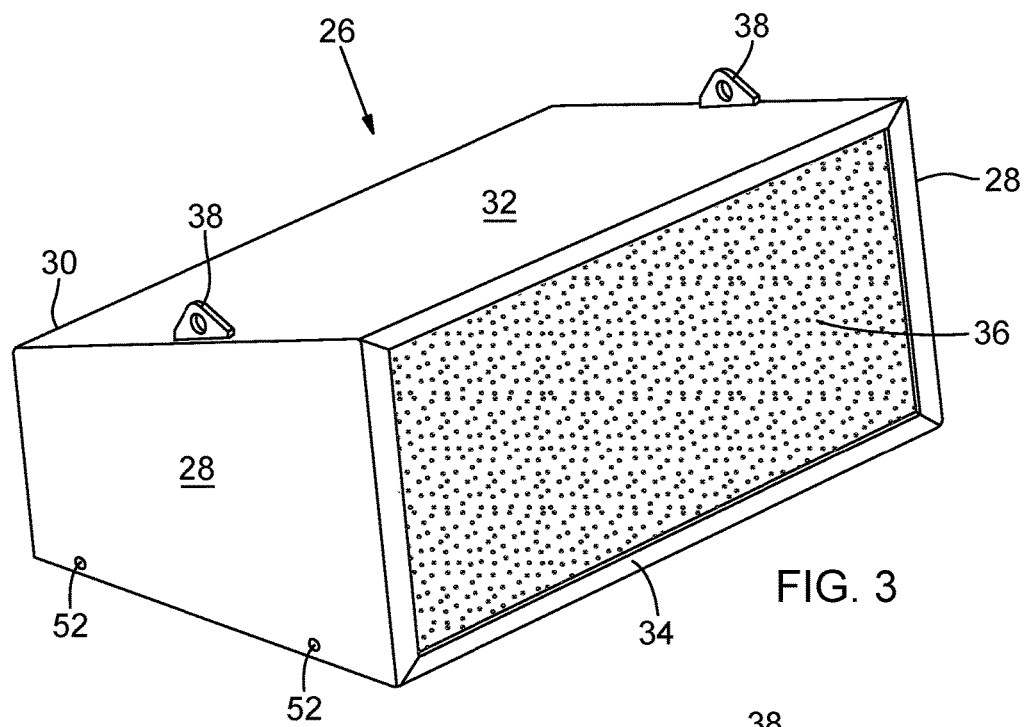
FIG. 3 is a perspective view of one embodiment of a counterweight.

In the following detailed description, reference is made to the accompanying drawings which form a part hereof, and in which are shown by way of an illustrated embodiment that may be practiced. It is to be understood that other embodiments may be utilized and structural or logical changes may be made without departing from the scope. Therefore, the following detailed description is not to be taken in a limiting sense.

Various operations may be described as multiple discrete operations in turn, in a manner that may be helpful in understanding embodiments; however, the order of description should not be construed to imply that these operations are order-dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

A stacking system is provided for conveying bulk material, including a conveyor frame designed to support a conveyor belt, the conveyor frame including forward and rear portions, a hopper designed to receive the bulk material, the hopper being mounted to the rear portion of the conveyor frame, an engine for providing power to the stacking system, a drive pulley for driving the belt, and an idler pulley disposed generally below the hopper. The improvement described herein comprises a counterweight disposed above the idler pulley and to the rear of the hopper. The counterweight may comprise a box that may be filled with concrete or some other heavy material.

Another way to describe the disclosed embodiment is as a counterweight for a belt-type, portable stacking conveyor. The conveyor may have forward and rearward portions, a drive pulley disposed toward the forward portion and an idler pulley disposed adjacent the rearward portion of the conveyor. In this embodiment, the counterweight would be disposed immediately above the idler pulley. The conveyor may include a hopper disposed adjacent the rearward portion of the conveyor, and the counterweight may be disposed rearwardly of the hopper. The counterweight may take the form of a trapezoidal box that may be filled with a heavy material.

A preferred embodiment may be used as a counterweight to a conventional stacker, such as the belt-type portable stacker depicted at 10 in FIG. 1. A stacker frame is identified at 12, the hopper is shown at the rearward end at 14, and the engine to power to unit is at 16. Stacker 10 is used to stack bulk material in one or more stacks, one of which is identified at 18.

FIG. 2 shows stacker 10 mounted to a fifth wheel 20 of a tractor 22, with the unit being hinged at 24 to limit the length thereof for transport between work sites.

It can be seen that with engine 16 centrally disposed, the center of gravity of the stacker will also be generally in the center of the stacker. As previously described, the drawback with this is that it will tend to limit the angle of elevation of the stacker, and thereby limit the size of the stack 18 formed thereby.

The depicted embodiment provides a box 26 that is disposed immediately rearwardly of hopper 14, which may be at the farthest rearward end of stacker 10. Box 26 may be filled with heavy material such as concrete. With this heavy box 26 disposed at the far rearward end of stacker 10, it can be appreciated that the stacker may be tilted at a steeper operating angle, thus, again, permitting the stacker to form higher stacks 18 than otherwise would be possible. Another advantage of having box 26 disposed at the far rear end of the stacker is that it can be disposed directly over the fifth wheel 20 of the tractor 22, thus adding to the stability of the stacker during transport operations.

Box 26 is perhaps best shown in FIG. 3. It includes parallel sides 28, a back 30, a top 32 and a front 34. The front 34 may not include a plate such as the other faces of the box. So, for example, if box 26 is filled with concrete, such as shown at 36, the concrete may form the front 34 of the box.

Figure 4:
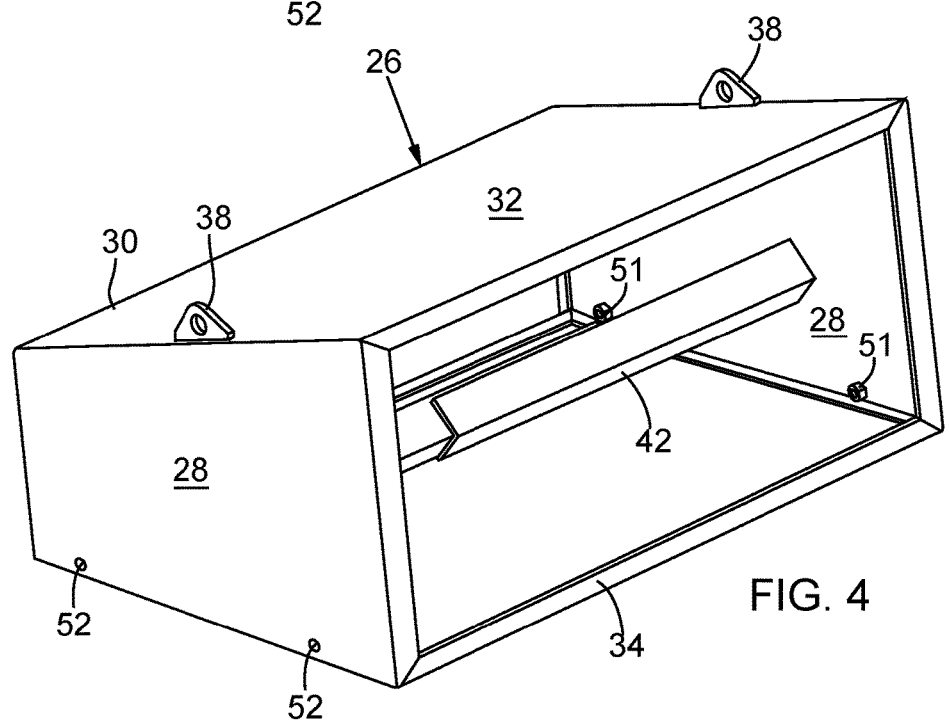
FIG. 4 is a perspective view of the interior of the counterweight of FIG. 3, showing a supporting, internal angle iron.

Box 26 may include a pair of hooks 38 disposed at the top side edges to permit the box to be grasped by a pair of eyelets (not shown) and raised off the stacker by a crane or other piece of heavy equipment. FIG. 4 shows an angle iron 42 extending between side walls 28 to provide support for the box.

Figure 7:
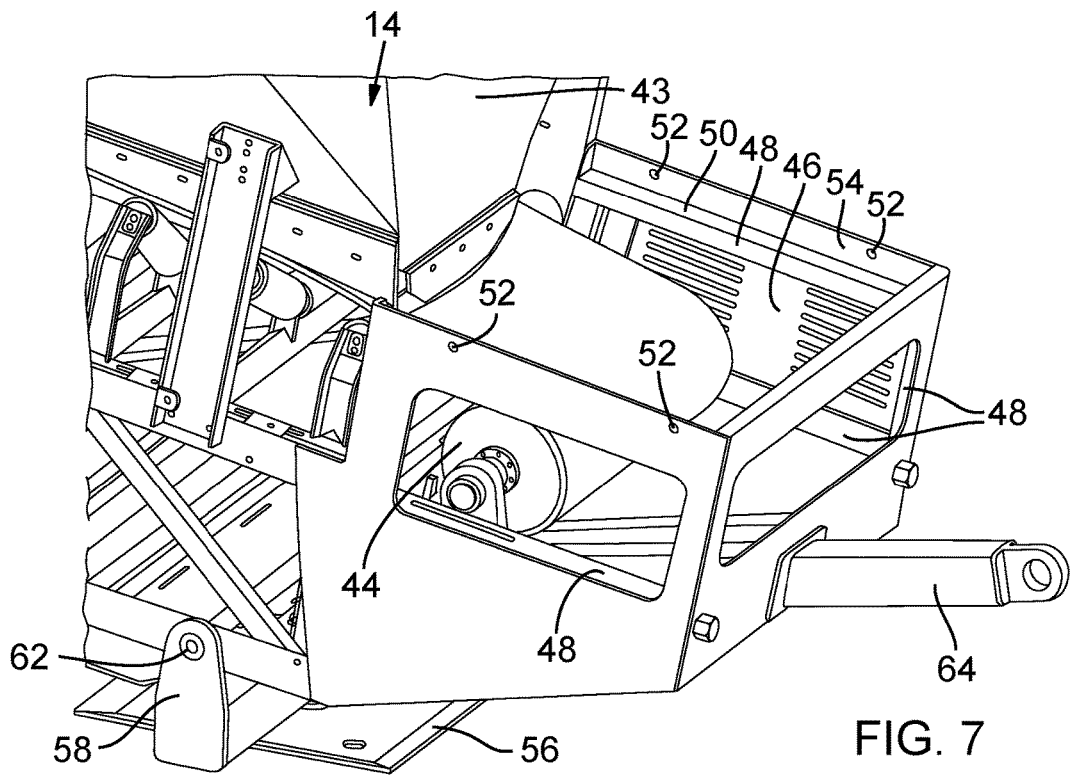
FIG. 7 is a perspective view of the conveyor of FIGS. 1-6, before the counterweight is mounted in place, with two of the idler access doors removed.
Figure 8:
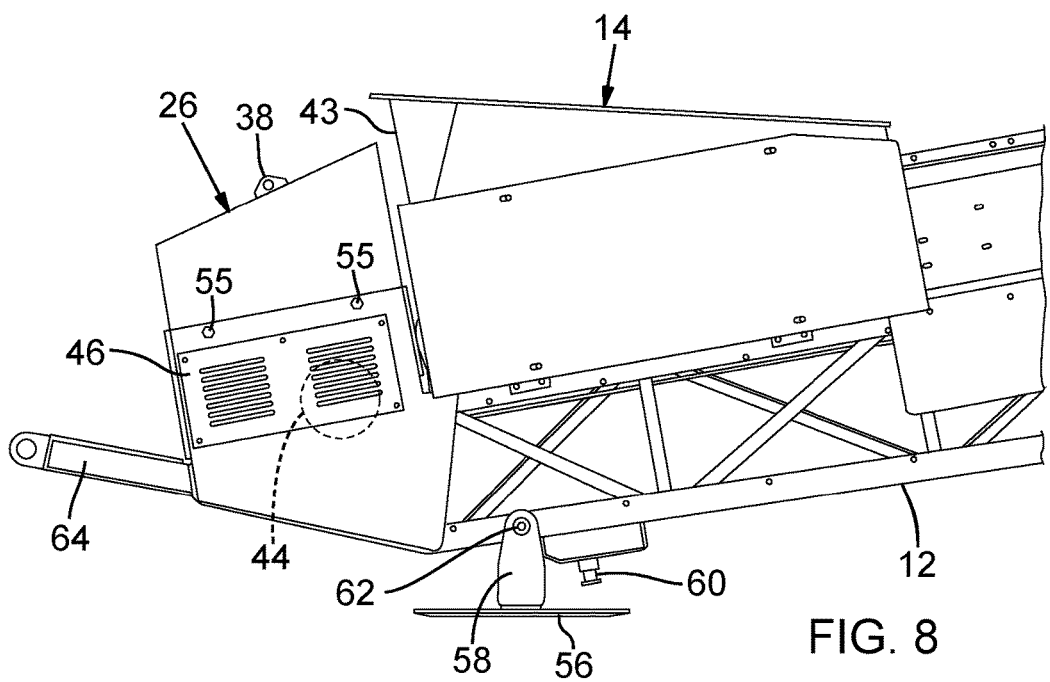
FIG. 8 is a side elevation view of the embodiment of FIGS. 1-7, with a pivot pad in place for conveying operations.

Box 26 may be mouted to the rear of hopper 14. FIG. 8 shows that box 16 may be mounted to stacker 10 in close proximity with a rear wall 43 of hopper 14. In certain embodiments, box 26 may even be in abutment with rear wall 43. Box 26 is typically positioned directly above an idler pulley 44 (see FIG. 5-7). The idler pulley 44 is normally accessed by three different idler access doors 46, and thus the position of box 26 does not have to interfere with such access. Also, there would be no substantial surfaces disposed below the belt to collect debris and, again, to limit access to the idler pulley.

Figure 5:
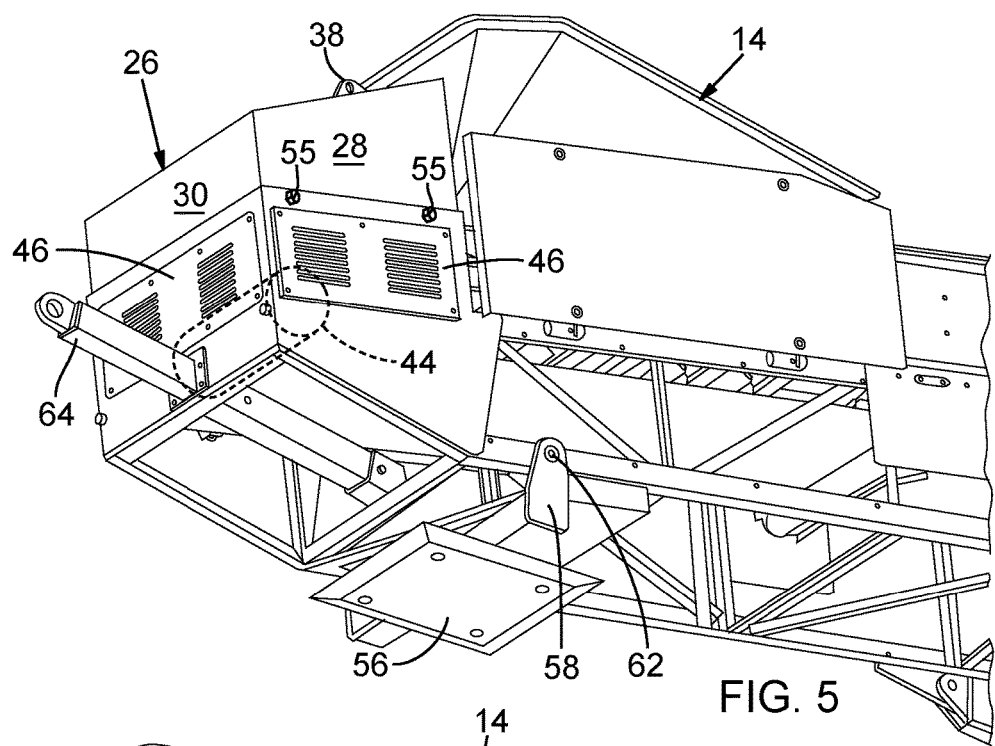
FIG. 5 is a perspective view of the counterweight of FIGS. 1-4 in place adjacent the rear end of a conveyor.
Figure 6:
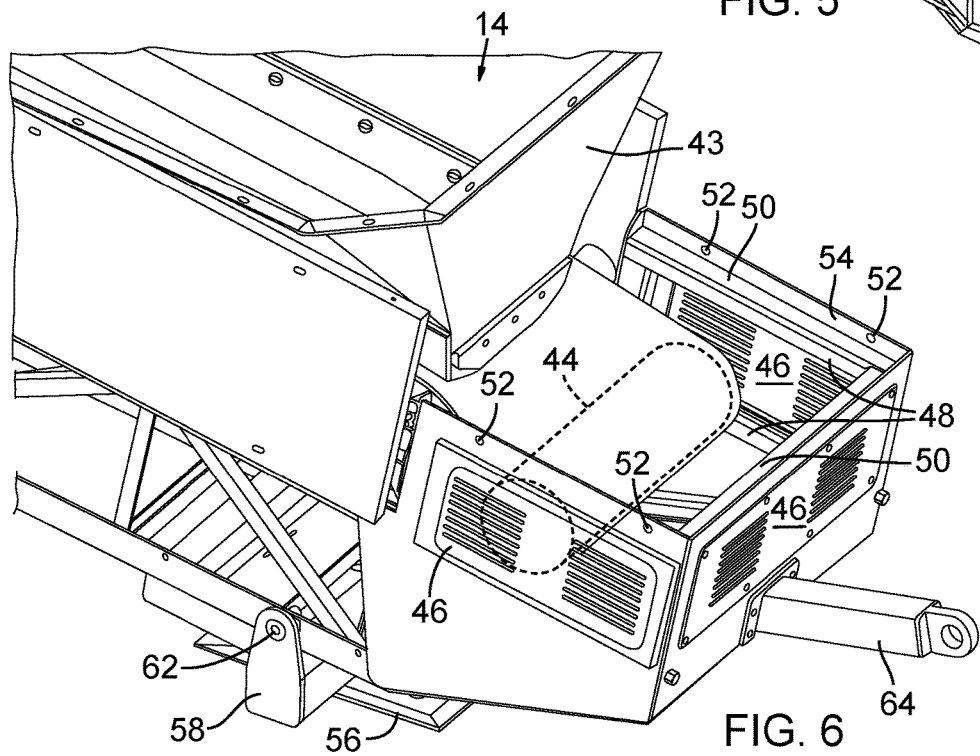
FIG. 6 is a perspective view of the conveyor of FIGS. 1-5, before the counterweight is mounted in place, showing framing disposed below where the counterweight will be mounted.

With box 26 positioned as depicted, a frame 48 may be provided to support that weight of the box. Frame 48 typically takes the form of a plurality of tubes welded in place as shown in FIGS. 6 and 7. FIGS. 6 and 7 also show an upwardly-facing, three-sided flange 50 formed by the tops of frame 48 for receiving and supporting box 26. Bolt holes 52 may be provided in a raised edge 54, as seen in FIGS. 5 and 6. Bolts 55, shown in FIG. 5, may screw into nuts such as nut 51, welded to side walls 28, shown in FIG. 4.

FIG. 8 shows a king pin 60 that may mount to fifth wheel 20 of tractor 22. Alternatively, a pivot base 56 may be provided for supporting stacker 10 when it is performing stacking operations. Pivot base 56 may be mounted to stacker frame 12 by a pair of extensions 58 that are pivotally mounted to the frame by a pair of pivot pins 62. To mount king pin 60 to a fifth wheel 20, pivot pins 62 would typically be removed, along with extensions 58 and pivot base 56. This assembly would then be placed somewhere on the stacker when the stacker is being moved to another work site.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A stacking system for conveying bulk material, including a conveyor frame designed to support a conveyor belt, the conveyor frame including forward and rear portions, a hopper designed to receive the bulk material, the hopper being mounted to the rear portion of the conveyor frame, an engine for providing power to the stacking system, a drive pulley for driving the belt, and an idler pulley disposed generally below the hopper, the improvement comprising:

a counterweight disposed generally above the conveyor belt, immediately to the rear of the hopper.

2. The stacking system of claim 1 wherein the counterweight is disposed at the same vertical level as the hopper.

3. The stacking system of claim 2 wherein the counterweight comprises a box filled with concrete.

4. A counterweight for a belt-type, portable stacking conveyor having forward and rearward portions, a drive pulley disposed toward the forward portion of the conveyor and an idler pulley disposed at the rearward portion of the conveyor, the counterweight being disposed immediately above the idler pulley.

5. The counterweight of claim 4 wherein the conveyor further includes a hopper disposed adjacent the rearward portion of the conveyor and the counterweight is disposed immediately rearwardly of and at the same level as the hopper.

6. The counterweight of claim 5, wherein the counterweight comprises a trapezoidal box that may be filled with a heavy material.

7. The stacking system of claim 1 wherein the system is a radial stacking system for conveying and stacking bulk material, and further comprising a radial pivot pad disposed below the hopper and designed to support and facilitate the pivoting of the conveyor.

* * * * *